3,549,569

POLYURETHANE COATING COMPOSITIONS PREPARED FROM 1-ISOCYANATO-3-ISOCYANATOMETHYL-3,5,5-TRIMETHYLCYCLOHEXANE

Basil S. Farah, Elma, and Herbert M. Schroeder, Williamsville, N.Y., assignor to Textron Inc., a corporation of Delaware No Drawing. Continuation-in-part of applications Ser. No. 585,262, Oct. 10, 1966, and Ser. No. 630,528, Apr. 13, 1967. This application June 29, 1967, Ser. No. 649,801
Int. Cl. C08g *22/06*
U.S. Cl. 260—18 30 Claims

ABSTRACT OF THE DISCLOSURE

Urethane prepolymer coating compositions are made from 1-isocyanato-3-isocyanatomethyl-3,5,5-trimethyl cyclohexane and aliphatic polyols or water at a total NCO to OH ratio of at least 1.2:1. When the coating composition is moisture-curing the polyol preferably has as its major component aliphatic polyol having a molecular weight of at least about 500. When the coating composition is polyolcuring the polyol used in making the prepolymer preferably has as its major component aliphatic polyol having a molecular weight of up to about 200, and the polyol used to cure the composition preferably has as its major portion aliphatic polyol having a molecular weight of at least about 500. These prepolymer coating compositions may contain about 3 to 35 weight percent of free isocyanate groups and the compositions are of application viscosity, at least when in a solvent, even when derived from a polyol component containing a significant proportion of polyol having three or more hydroxyl groups and therefore exhibits cross-linking tendencies. Cured coating made from the prepolymer compositions exhibit outstanding resistance to the discoloring action of ultraviolet light rays and possess other desirable properties such as good adherence to substrates and excellent abrasion resistance and strength.

This application is a continuation-in-part of application Ser. No. 585,262, filed Oct. 10, 1966, abandoned and application Ser. No. 630,528, filed Apr. 13, 1967, now abandoned.

This invention relates to polyurethane compositions. More particularly, the invention concerns polyurethane prepolymers made from 1-isocyanato-3-isocyanatomethyl-3,5,5-trimethyl cyclohexane and aliphatic polyols or water. These prepolymers can be cured by reaction with an active-hydrogen containing material which reacts with free isocyanate groups, e.g. water, aliphatic polyol, etc. or mixtures thereof, and when formed as coatings, exhibit outstanding resistance to the degradative and yellowing action of ultraviolet light rays. The cured coatings, moreover, are stable, adhere firmly to various substrates and possess excellent abrasion and strength properties. The use of 1-isocyanato-3-isocyanatomethyl-3,5,5-trimethyl cyclohexane is highly advantageous in coating compositions whose prepolymers are made from aliphatic polyol at least a portion of which has at least three hydroxy groups.

It has been known for several years that polyurethane coating films which have been cured by reaction of free residual isocyanate groups in the polymer, become increasingly yellow on continued exposure to sunlight. Since light from an ultraviolet lamp gives a similar effect, it is apparent that the ultraviolet part of the spectrum of sunlight causes most of the yellowing. Coatings made from aromatic diisocyanates yellow to the greatest extent, but polyurethane coating films made from several aliphatic diisocyanates also yellow significantly, although less, when exposed to ultraviolet light. Furthermore even though the aliphatic diisocyanates are relatively advantageous in this regard there may be difficulties in producing satisfactory coatings from urethanes from these diisocyanates, especially where the urethane prepolymer is made from aliphatic polyol having at least three hydroxl groups and thus is cross-linked with a tendency to form intractable gels before being cured.

In spite of these problems such coating vehicles are highly desirable. The moisture-curing vehicles are especially of interest since their viscosity does not change if contact with water is limited and, accordingly, with proper care the viscosity can remain more or less constant during storage prior to application of the coatings to substrates. Curing in the can can be stopped even when only a portion of the contents are used, simply by resealing the can or otherwise holding the composition out of contact with moisture. Moreover, moisture-cured coatings are generally hard, chemically-resistant and of low water permeability.

By the present invention, we have discovered that the prepolymer-type polyurethane coating compositions derived essentially from 1-isocyanato-3-isocyanatomethly-3,5,5-trimethyl cyclohexane, that is,

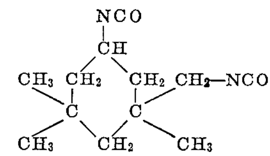

and one or more aliphatic polyols, water or their mixtures have, when cured as coatings, excellent resistance to yellowing under the influence of ultraviolet light and at the same time possess other desirable properties needed in cured polyurethane coatings and finishes. Even the prepolymers derived from this diisocyanate and polyol components composed in part or entirely of polyols having three or more hydroxl groups, can be made to remain in an essentially liquid state and are highly suitable prepolymer coating compositions. Although the essential isocyanate used in making our prepolymers is 1-isocyanato-3-isocyanatomethyl-3,5,5-trimethyl cyclohexane minor amounts of other polyisocyanates may be present providing the coatings are not unduly deleteriously affected, for instance, the use of aromatic diisocyanates could lower the resistance of the coatings to the effects of ultraviolet light and the presence of diisocyanato dicyclohexyl methane makes the prepolymers more susceptible to gellation. German Pat. 1,202,785 and Belgian Pat. 666,023, disclose 1-isocyanato-3-isocyanatomethyl-3,5,5-trimethyl cyclohexane which can be made by phosgenation of 1-amino-3-aminomethyl-3,5,5-trimethyl cyclohexane, preparation of the latter being described in Belgian Pat. 621,259.

Due to the high resistance of the 1-isocyanato-3-isocyanatomethyl-3,5,5-trimethyl cyclohexane-derived coatings to the deteriorating and yellowing action of ultraviolet light we can prepare clear coatings which remain of considerably lighter color than those which can be produced from many isocyanates, especially the aromatic diisocyanates such as toluene diisocyanates. Moreover, when our compositions are colored, for instance through the addition of pigments, the polyurethanes remain stable over prolonged periods, whereas coating vehicles and coatings derived from other diisocyanates may darken continually on exposure to light, for example, when the vehicles are stored in transparent containers. Thus, the polyurethanes of the present invention have potentially wider areas of use than most polyurethanes heretofore available and our compositions can, for instance, be employed in clear or pigmented, non-yellowing wood finishes such as floor finishes and marine finishes; non-yellowing and non-chalking, enamel finishes, e.g. for automobile bodies; and for many other uses. This great potential for the compositions of our invention is further made possible since our coating films having high strength, abrasion resistance and hardness, do not crack or mar easily and have good substrate and intercoat adhesion properties so that the coatings resist peeling and blistering upon weathering.

The urethane polymers of the invention are essentially made by reaction of 1-isocyanato-3-isocyanatomethyl-3,5,5-trimethyl cyclohexane with urethane-forming aliphatic polyols or water, and the urethanes prior to curing, which takes place after application of the urethane prepolymer as a coating, are in the essentially liquid state either as the polymer per se or dissolved in a solvent. The uncured polymer or prepolymer is generally stable in the sense that the prepolymer will not cure to a solid unless further contacted with water, aliphatic polyol or other active-hydrogen containing material. These prepolymers can have a free isocyanate group content of about 3 to 25 or even 35 or more weight percent based on polymer content or solids.

The prepolymer-forming reaction mixture contains a ratio of total isocyanate groups to total hydroxyl radicals (including the OH of water) of at least 1.2:1, often up to about 3.5:1 or more. In the case of moisture-curing prepolymers this ratio is often 1.2 to 2.5:1, preferably 1.3 to 2.1:1, and the ratio of isocyanate groups to hydroxyl groups can affect the properties of the moisture-curing coating compositions. Increases in the ratio give coatings of greater film hardness and mar resistance while flexibility and impact resistance may be adversely affected. Also, larger amounts of free isocyanate groups increase the toxicity and cost of the compositions. The free isocyanate groups in such moisture-curing prepolymers are often from about 3 to 12 weight percent, with about 5 to 10 percent being preferred, based on polymer content or solids.

In the case of aliphatic polyol-curing prepolymers the prepolymer-forming reaction mixture generally contains a ratio of total isocyanate groups to total hydroxyl radicals of 1.4 to 3.5:1 or more, preferably 1.6 to 2.1:1. The ratio of isocyanate groups to hydroxyl groups can affect the properties of the coating composition, but undesirable results can be offset somewhat by using an aliphatic polyol for curing of appropriate molecular weight, e.g. polyol whose major portion by weight has a molecular weight of at least about 500. With a given prepolymer, increases in the ratio of NCO to OH give coatings of greater film hardness and mar resistance while flexibility and impact resistance may be adversely affected, but these effects can be modified by using a long chain polyol for curing. The free isocyanate groups in such polyol-curing prepolymers are generally about 10 to 25 or even 35 or more weight percent, with about 15 to 20 weight percent being preferred, based on polymer content or solids.

Aside from water a component used in making the prepolymer compositions of the present invention is, as noted, one or more aliphatic polyols, for instance, the diols, triols, other polyols, including the ether polyols, or their mixtures. The polyols have at least two hydroxyl groups attached to aliphatic carbon atoms, and may be selected from a wide variety of polyhydroxyl materials which may be aliphatic, including cycloaliphatic, hydrocarbon compounds, including substituted-hydrocarbon compounds. A minor amount of aromatic polyols or phenols may, if desired, be included in the polyurethane prepolymers but they may lead to unsatisfactory results. The polyol may often have a molecular weight up to about 5000 or more, but preferably has a molecular weight of up to about 3000. As the molecular weight of the polyol increases at a given NCO/OH mole ratio in the reaction mixture for forming moisture-curing prepolymers, cured coatings of decreased hardness are obtained. On the other hand the same amount of isocyanate if employed with low molecular weight polyols can lead to moisture-cured coatings which are hard and brittle. Thus in moisture-cured coatings, brittleness and hardness are in general increased as the amount of diisocyanate is increased or the molecular weight of the polyol is reduced.

Representative polyol classes and individual compounds useful in making the various prepolymers are given below. In making the moisture-curing prepolymers of this invention it is preferred that the major portion of the total polyol component have a molecular weight of at least about 500. In the case of moisture-curing prepolymers it is preferred that they be made from polyols having 2 to 3 hydroxyl groups which may or may not be terminal, i.e. at an end of the longest chain of the molecule. Also, when the polyol component used in making moisture-curing prepolymers contains lower molecular weight aliphatic polyol, which will often be the minor amount by weight of the total polyol, such lower molecular weight material preferably has a molecular weight of up to about 200. Sometimes in such cases the low and high molecular weight polyols are used in approximately equal molar ratios. In making the polyol-curing prepolymers it is preferred that on a weight basis the major portion up to all of the polyol has a relatively low molecular weight of up to about 200. In this case the aliphatic polyol added for curing can be one or more of the various types mentioned herein, but we prefer that the curing polyol be composed to a major extent on a weight basis, of aliphatic polyol having a molecular weight of at least about 500. The curing polyol may also be composed entirely of such high molecular weight material.

The aliphatic polyol employed in making the polyurethane-type prepolymers or cured products of the present invention may be one or more polyhydric alkanols which can be the only polyol used or other polyols may also be employed. The aliphatic alcohols have at least 2 carbon atoms, and among the wide variety of such materials which can be used are those represented by the formula:

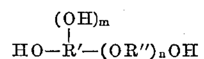

$$HO-\overset{(OH)_m}{\overset{|}{R'}}-(OR'')_nOH$$

in which R′ is an aliphatic hydrocarbon radical, preferably saturated, and R″ is an alkylene radical of 2 to 4, preferably 2 to 3 carbon atoms, R′ preferably has 2 to 12 advantageously 2 to 6 carbon atoms. The letter $n$ represents a number from 0 to about 50, preferably 2 to 30 or even about 5 to 30, for more flexible coatings, while the letter $m$ is 0 to 2 or more. When $n$ is other than 0, R′ may often be the same as R″. Also, $n$ may be a number which gives a polyol of desired molecular weight for making the prepolymer or for curing. The aliphatic alcohol reactant can be substituted with non-deleterious substituents and the lower molecular weight polyether glycols, e.g., of 2 to 4 ethylene oxide units, are preferred reactant materials.

Suitable aliphatic alcohols include the polyether glycols of up to about 5000 or more molecular weight, such as the polyethylene glycols, for instance, of up to about 3000 molecular weight, propylene glycol, polypropylene glycols, for instance, of up to about 3000 molecular weight, ethylene glycol, glycerol, polybutylene glycols, trimethylol propane, butane diols, trimethylol ethane, 1,6 - hexamethylene glycol, 1,2,6 - hexanetriol, sucrose, sorbitol, etc.

Others among the non-drying polyols useful in the invention include the hydroxy esters such as castor oil, polyol-modified castro oils, other polyol-modified non-drying oils and hydroxy-terminated polyesters. The hydroxy-terminated polyester materials are generally made by reaction of one or more aliphatic polyhydroxy alcohols, such as the aliphatic polyols mentioned above, with one or more aliphatic, including cycloaliphatic, or aromatic polycarboxylic acids or esters, and such polyesters may have hydroxyl values in the range of about 25 to 150. Frequently in these polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, dimers of olefinically-unsaturated monocarbozylic acids, such as linoleic acid dimer, etc. Modified castor oil partial esters can be made by ester interchange of the oil with polyols such as low molecular weight polyols, including glycols, glycerine, pentaerythritol, etc.

The reaction of diisocyanates with aliphatic polyols does not of necessity give satisfactory coating compositions. Thus, the isocyanate-polyol prepolymers must be stable and in an essentially liquid state, at least when in a solvent, to be useful as coating compositions. There is a greater tendency to produce intractable prepolymer gels when the polyol contains a cross-linking component which has at least three hydroxyl groups per molecule, yet such cross-linked prepolymers if of proper viscosity are highly desirable coating compositions.

The difficulty encountered with cross-linked prepolymers is illustrated by the fact that when a mixture of trimethylolpropane, polypropylene glycol of about 1000 molecular weight and butylene glycol (2:1:1 mole ratio) was reacted with diisocyanato dicyclohexyl methane at an NCO to OH ratio of 1.65:1, an intractable gel was obtained. When, however, this isocyanate was replaced with an equivalent amount of 1 - isocyanato - 3 - isocyanatomethyl - 3,5,5 - trimethyl cyclohexane, a coating composition of application viscosity was produced and moisture-cured coatings of the composition had excellent properties. Thus, the prepolymer compositions of the present invention especially include those in which at least a portion of the polyol reactant is an aliphatic polyol having at least three hydroxyl groups per molecule such as those mentioned before including the polyols of the defined formula where $m$ is 1 to 2, trimethylol propane, trimethylol ethane, 1,2,6-hexanetriol, sucrose, sorbitol, etc. Such cross-linking aliphatic polyols often have about 3 to 12, preferably about 3 to 6, carbon atoms. By using the cross-linking polyols with 1-isocyanato-3-isocyanatomethyl - 3,5,5 - trimethyl cyclohexane, lesser amounts of the diisocyanate can be employed and still obtain an ungelled prepolymer vehicle than when the diisocyanate is, for instance, diisocyanato dicyclohexyl methane. Also the 1 - isocyanato - 3 - isocyanatomethyl-3,5,5-trimethyl cycolhexane permits the use of larger amounts of the cross-linking alcohol without obtaining gels. When the polyol component used in making the prepolymer contains cross-linking polyol essentially the entire polyol may have at least about three hydroxyl groups per molecule and often at least about 10, preferably at least about 30, mole percent of the hydroxyl groups are supplied by the cross-linking polyol.

The polyurethane-type prepolymer reaction products of the present invention can be made by simultaneous reaction of excess 1-isocyanato-3-isocyanatomethyl-3,5,5-trimethyl cyclohexane and polyol or water. Alternatively, the diisocyanate can be reacted with part or all of one or more of the polyols or water prior to the reaction with the remaining portion of these materials. Stepwise mixing of the diisocyanate with the polyols or water may be used to enhance temperature control. The reaction temperatures for making the various urethane prepolymers of the present invention are often in the range of about 40 to 150° C., with about 50 to 130° C. being preferred; and the reaction is preferably continued until there is essentially little, if any, unreacted hydroxyl functionality remaining. As noted above wide variations in the nature and amounts of the polyol, water or their mixtures used in the preparation of the prepolymer coating compositions of this invention can be made. Catalysts may be used in forming the prepolymers to accelerate the rate of reaction, e.g. the catalysts may be similar to those which can be employed to accelerate curing.

The rate of curing of the coating compositions of this invention may be enhanced as desired by incorporation of appropriate amounts of a catalyst which promotes the reaction of isocyanato groups with water or polyols. Typically organotin compounds, for example dibutyl tin dilaurate and stannous octoate may be used. Other useful catalysts include tertiary aliphatic and alicyclic amines, such as triethyl amine, triethanol amine, tri-n-butylamine, triethylene diamine, alkyl morpholines and the like. Complex mixtures containing such catalysts in modified form may also be employed. In any event the free isocyanate groups in the prepolymer when exposed to moisture of the atmosphere or aliphatic polyol form cross-links which produce tough and relatively permanent coatings.

The prepolymers of the present invention may be prepared in the presence of an essentially inert solvent. The solvent serves to insure that the reactants are in the liquid state and the solvent permits better temperature control during the reaction by serving as a heat sink and, if desired, as a refluxing medium. Various solvents including mixtures of such materials may be employed and among the useful organic solvents are the aliphatic and aromatic hydrocarbons, esters, ethers, keto-esters, ketones, glycol-ether-esters, chlorinated hydrocarbons, and the like and mixtures thereof. Frequently, the solvents are volatile materials which will be removed from the composition while it cures as a coating or film, and in such case, there may be no need to remove any portion of the solvent from the reaction product prior to application as a coating. The amount of solvent employed may vary widely and large volumes may be uneconomic or give materials with undesirably or inconveniently low viscosity. The amount of solvent may be selected in order to provide a reaction product of film application viscosity, but products of greater viscosity can be cut-back before use. Often about 0.25 to 6 weights of solvent, preferably about 0.5 to 3 weights of solvent, per weight of the total isocyanate and polyol or water in the prepolymer are used. Among the suitable normally liquid solvents are toluene, xylene, ethylbenzene, 2-ethoxyethyl acetate, 1,1,1-trichloroethane, methylisobutyl ketone, dimethylformamide, dimethylsulfoxide, dioxane, etc. and their mixtures; and it is preferred that the solvent not contain more than about 10 carbon atoms per molecule.

The coating compositions of this invention are normally applied to solid substrates as films of less than 10 mils thickness and can contain other additives to impart special properties such as plasticizers, etc. Also, the substrate for the coating may be specially treated materials, including flammable members impregnated with fire-resistant chemicals or coated with a sealant.

The following examples will serve to illustrate the present invention. In the examples the parts indicated are by weight and the percents NCO are reported on the basis of the total weight of the vehicle. The prepolymer-forming reactions were conducted under a nitrogen atmosphere.

EXAMPLE I

A mixture of 89 parts 1-isocyanato-3-isocyanatomethyl-3,5,5-trimethyl cyclohexane, 113 parts of a polyether polyol prepared from the addition of propylene oxide to 1,2,6-hexanetriol to a molecular weight of about 700, 0.2 part dibutyl tin dilaurate (or 0.1% of solids) and 135 parts of a 50/50 mixture of xylene and ethoxy ethanol acetate are heated at about 90° C. for about 3 hours. The reaction product is an isocyanate-terminated prepolymer which when coated on a metal plate and allowed to cure by exposure to atmospheric moisture, produces a tough and flexible film of good gloss. The prepolymer has an NCO content of 5.24% (8.8% on solids), a Gardner-Holdt viscosity of A–⅛ and Gardner color of 1–. A portion of the prepolymer cast on a Morest Chart at a 3 mil thickness dried in 15 hours after curing. The film is exposed to ultraviolet radiation for 2 hours using a Burdick Type QA–450–A.C. 60 cy. ultraviolet lamp at a height of 18 inches from the light source to the film surface. The exposed film is not yellowed to any extent by exposure to the radiation source.

EXAMPLE II

A moisture-curing coating composition is prepared as described in Example I except that the amount of dibutyl tin dilaurate catalyst is increased to 2.0 parts (or 1.0% of solids). A film cast from this curing composition has a curing time of 5.5 hours compared to the cure time of 15 hours of the composition of Example I.

EXAMPLE III

A sample of the prepolymer from Example I is treated with 2 weight percent (based on total solids) of N-coco morpholine catalyst and heated for about 3 hours at 130° C. The composition obtained has an NCO content of 3.80 weight percent. A film cast from the composition and exposed to atmospheric moisture becomes tack free in 4 hours and is completely cured throughout in about 13 hours.

EXAMPLE IV

A mixture of 43.6 parts of polypropylene glycol of molecular weight 1025, 3.7 parts 1,4-butylene glycol, 11.3 parts trimethylol propane, 78.5 parts 1-isocyanato-3-isocyanatomethyl-3,5,5-trimethyl cyclohexane and 139 parts of a 50/50 mixture of Cellosolve acetate and xylene is heated at about 90°–95° C. for about 3.5 hours. To the prepolymer obtained 2.02 parts (or 2 weight percent of total solids) of N-coco morpholine catalyst is added to produce a moisture-curing composition having an NCO content of 4.15 percent (8.3% on solids). Films produced from the composition do not yellow on exposure to ultraviolet radiation as described in Example I.

EXAMPLE V

An oil-modified, moisture-curing polyurethane coating composition is prepared by heating a mixture of 87.6 parts 1-isocyanato-3-isocyanatomethyl-3,5,5-trimethyl cyclohexane, 81.5 parts dielectric grade caster oil, 207 parts toluene and 1.38 parts dibutyl tin dilaurate for 6 hours at about 45° C. The prepolymer composition has an NCO content of 3.12 percent (about 8% on solids), viscosity of A5 and APHA color of 55. A 3 mil film of the composition cast on a Morest Chart dried in about 13 hours to produce a coating which showed no detectable yellowing on exposure to ultraviolet radiation, as described in Example I.

EXAMPLE VI

A polyester is prepared by heating a mixture of 588 parts of commercial linoleic dimer acid (Emery's Empol 1018, 150 parts phthalic anhydride, 99 parts maleic anhydride, 1257 parts diethylene glycol and 200 parts xylene at 150°–210° C. while water is continuously removed. The temperature of the reaction mixture is gradually increased to about 230°–250° C. and heating is continued until the product acid value decreases to about 9.2. There is obtained a polyester having a viscosity of 3600 poises, hydroxyl number 46.6 and Gardner color of 9+. Seventy parts of this polyester, 13.8 parts trimethylol propane, 5 parts 1,3-butylene glycol, 257 parts of a 50/50 mixture of Cellosolve acetate and xylene, 0.19 parts dibutyl tin dilaurate and 100 parts 1-isocyanato-3-isocyanatomethyl-3,5,5-trimethyl cyclohexane are heated at about 90° C. for about 4 hours. There is obtained a coating composition having an NCO content of 4.04% (about 9.5% on solids), a viscosity of G+1/4 and Gardner color of 4+. Moisture-cured coatings derived from the composition showed outstanding resistance to ultraviolet light.

EXAMPLE VII

An isocyanate-terminated prepolymer is prepared by heating together 100 parts 1-isocyanato-3-isocyanatomethyl-3,5,5-trimethyl cyclohexane, 16.4 parts trimethylol propane and 77 parts of a 50/50 mixture of xylene and Cellosolve acetate at about 65° C. for about 3 hours and at about 90° C. for about 6 hours. The product has an NCO content of 8.53 weight percent (about 18% on solids), a viscosity of U and Gardner color of 1–. The prepolymer is mixed at 1:1 NCO/OH ratio with esterified castor oil having an equivalent weight of about 200 obtained by esterifying castor oil with pentaerythritol, to produce a composition which when coated on a substrate and baked at 130° C. for about 15 minutes dried to a tough film of excellent gloss. The dried film is not affected on exposure to ultraviolet radiation for two hours using a Burdick Type QA–450–A.C. 60 cy. ultraviolet lamp at a height of 18 inches from the light source to the film surface.

EXAMPLE VIII

About 100 parts by weight of a polyoxypropylene glycolcol of approximately 1000 molecular weight was mixed with about 18.5 parts 1,4 butanediol and about 26 parts trimethylol propane in a 2 liter, four neck, round bottom flask provided with a nitrogen inlet tube, a mechanical stirrer, a temperature indicator and a Dean Stark trap under a reflux condenser. 160 parts of xylene and 160 parts of ethylene glycol monoethylether acetate were added and the mixture was boiled for a one hour period with stirring under nitrogen cover while azeotropically removing moisture. The mixture was then allowed to cool. 180 parts of 1-isocyanato-3-isocyanatomethyl-3,5,5-trimethyl cyclohexane was added to the mixture. A small heat of reaction was evolved. Following this the mixture was heated to 80° C. and was held at this temperature for 5 hours. The resultant vehicle had a viscosity of one stoke, a free isocyanate content (NCO) of 4.27 percent (8.54 on solids), a Gardner color of less than one, and a non-volatile content of 50 percent. After the addition of 1% of dibutyl tin dilaurate at 3 mil wet film of vehicle was cast. The film was "set" in one hour and dried "hard" in 5 hours. The tough color-free, moisture-cured film was substantially color stable to high intensity ultraviolet light.

EXAMPLE IX

A mixture of 800 parts by weight of polyoxypropylene glycol 1025, 272 parts polyoxypropylene glycol 2025 and 50 parts of xylene are heated to reflux temperature in a reaction vessel with inert gas blanket and held at this temperature for one hour. After cooling to 40° C., 1.5 parts of dibutyl tin dilaurate and 476 parts of 1-isocyanato-3-isocyanatomethyl-3,5,5-trimethyl cyclohexane are added. The temperature is increased to 90° C. and held at 90° C. for about 30 minutes. The resultant vehicle had a viscosity of 34 stokes at 93% non-volatile, water white and contained 6.2% NCO. Upon the addition of 1% dibutyl tin dilaurate or 2% of 2,4,6-tri (dimethyl aminomethyl) phenol slow, moisture-curing films were obtained at room temperature. The curing rate could be accelerated with heat, e.g. 30′ at 150° C. The films retained sufficient tack to be useful for color stable, pressure-sensitive adhesives.

EXAMPLE X

To a clean, dry, three-neck, two-liter, round-bottom flask was charged 303 grams of a polyoxybutylene glycol of approximately 538 molecular weight, 42.5 grams of trimethylol propane, 3.4 grams of 2,6-ditertiary butyl, 4-methyl phenol and 232 grams of xylene. With a nitrogen atmosphere in the flask and stirring, the mixture was held in a state of reflux for 1 hour. Approximately twenty grams of distillate were collected in a Dean Stark water trap and discarded. When the mixture had returned to room temperature, 3.4 grams of dibutyl tin dilaurate were added, followed by 343 grams of 1-isocyanato-3-isocyanatomethyl-3,5,5-trimethyl cyclohexane. When exothermic heat of reaction ceased being emitted at about 88° C., heat was applied and the mixture held at 90° C. for three hours. An additional 763 grams of xylene was added along with 2.3 grams of 3 percent magnesium as neodecanoate. The temperature was increased to and held at 130° C. until the reaction mixture reached a viscosity of 0.5 stoke. The finished vehicle had a nonvolatile of 43.4 percent, a free isocyanate content (NCO) of 2.9 percent, a viscosity of 0.7 stoke and a Gardner color of 1 minus. A three mil wet film of the vehicle showed a set time a of ⅜ hour and tack free time of ⅝ hour. A film of this vehicle was essentially non-yellowing, while a similar toluene diisocyanate type vehicle yellowed considerably when exposed to ultraviolet light for the same period of time.

EXAMPLE XI

A two-can polyurethane coating composition is derived by combining a prepolymer composition prepared as described in Example V with an esterified castor oil of equivalent weight of about 200 obtained by esterifying castor oil with pentaerythritol. The prepolymer and the esterified castor oil are mixed at an NCO/OH ratio about 1/1. Films cast from the resulting composition have a dry time of about 4.5 hours. Coatings are obtained which are not visibly affected by ultraviolet radiation.

EXAMPLE XII

A polyurethane prepolymer was prepared from 224 grams (2 equivalents) of 1-isocyanato-3-isocyanatomethyl-3,5,5-trimethyl cyclohexane, 26 grams (1 equivalent) of pentaerythritol, 220 grams of dimethyl foramide, 0.25 gram of dibutyl tin dilaurate and 50 grams of toluene. The reaction was carried out in a glass flask provided with a thermometer, inlet for nitrogen, mechanical stirrer, reflux condenser, water trap and glass mantle for furnishing heat by electrical means. The pentaerythritol, dimethyl formamide and toluene were heated under azeotropic conditions (130° C.) to remove water, the procedure being performed under nitrogen cover with continuous stirring. Following this the mixture was allowed to cool. The diisocyanate and dibutyl tin dilaurate were added. The mixture was then heated to 80° C. and maintained at this temperature for 1 hour and 35 minutes until the percent of free isocyanate (NCO) in the resulting prepolymer reached a value of 6.51.

Five grams (.025 equivalent) of castor oil interesterified with pentaerythritol to a hydroxyl value of 280 were mixed with 16 grams (.025 equivalent) of the above prepolymer and cast on a Morest Chart in a 3 mil wet film. This film was set to the touch and tack free in 4½ hours and mar free in 9 hours. When this dry film was exposed for 2 hours to ultraviolet light from a 400 watt mercury arc lamp at a distance of 18 inches, very slight yellowing occurred. This film remained very flexible after exposure to ultraviolet light.

EXAMPLE XIII

An ester-based vehicle was prepared in the following manner from Emery Dimer Acid known as Empol 1018 having an acid value of 190, a saponification value of 195 and unsaponifiable material one percent. This dimer acid is made from linoleic acid and contains about 83 percent $C_{36}$ dibasic acid, 17 percent trimer acid with a small amount of monobasic acid. The reaction mixture consisted of 588 grams (2.01 equivalents) dimer acid, 150 grams (2.01 equivalents) phthalic anhydride, 99 grams (2.01 equivalents) maleic anhydride, 420 grams (7.95 equivalents) diethylene glycol and 200 grams of xylene, all of which were placed in a 2 liter flask under nitrogen. The mixture was heated for 1¼ hours over a temperature range of 155–210° C. to remove water by azeotropic distillation. The total amount of water collected in a Dean Stark trap was 92 grams as compared with a theoretical amount of 108 grams (6 equivalents). The mixture was heated for a further period of 7¼ hours over a temperature range of 210–230° C. The final ester product had a viscosity of 3600 poises, a Gardner color of 9 plus, an acid value of 8.4 and a hydroxyl value of 46.6

A polyurethane vehicle was prepared from the ester by placing 70 grams (.058 equivalent) of ester, 13.8 grams (0.307 equivalent) trimethylol propane, 5 grams (0.111 equivalent) of 1,3-butane diol, 128.5 grams ethylene glycol ethyl ether acetate and 128.5 grams exylene in a suitable reaction flask provided with a thermometer, mechanical stirrer, heating mantle, inlet for gaseous nitrogen, reflux condenser and Dean Stark water trap. This mixture was heated for 1 hour at 150° C. to remove water by azeotropic distillation from the reaction components. The temperature was then allowed to drop to 55° C. when 100 grams (0.905 equivalent) 1-isocyanato-3-isocyanatomethyl-3,5,5-trimethyl cyclohexane and 0.19 gram dibutyl tin dilaurate were added and stirred in. The temperature was kept at 90° C. for 1¾ hours after which the vehicle was allowed to cool to room temperature. A sample of the polyurethane prepolymer vehicle had a Gardner viscosity of G+¼, a Gardner color of 4 plus, a free isocyanate value of 4.04 percent NCO and a nonvolatile content of 40 percent.

Fifteen and seventy five one hundredths grams of the polyurethane prepolymer (equivalent weight 1050 and 40 percent nonvolatile) were mixed with 18 grams of the ester made from the dimer acid (equivalent weight 1200, hydroxyl value 46.6) and 18 grams of xylene. A 3 mil film of this mixture was cast on a Morest Chart and placed in a constant 77° F. temperature room having a relative humidity of 50 percent. The film was found to be set to touch in 3 hours. The film was still slightly tacky after 56 hours but was mar free. When this film was exposed to the ultraviolet light from a 400 watt mercury arc lamp for 4 hours, at a distance of 18 inches, it dried to a non-tacky condition and did not discolor.

EXAMPLE XIV

The following reacants were used to prepare a polyurethane having a free isocyanate group content that could be cured with a diol or polyol; 1-isocyanato-3-isocyanatomethyl-3,5,5-trimethyl cyclohexane, 400 grams (3.57 equivalents); trimethylol propane, 72.7 grams (1.61 equivalents); 1,3-butane-diol, 18.4 grams (0.41 equivalent); dibutyl tin dilaurate 0.5 gram; ethylene glycol ethyl ether acetate 165 grams; and xylene 165 grams. The diisocyanate, dibutyl tin dilaurate and the solvents were placed in a one liter flask and heated to about 45° C. The trimethylol propane was added slowly over a 2 hour period and the temperature kept at about 45° C. for 5 hours more. The 1,3-butanediol was added during one hour at this same temperature and the temperature maintained for 3 hours more. The reaction was conducted under a blanket of gaseous nitrogen with continuous stirring, the heating being supplied by means of a glass mantle from an electric power source. The flask was provided with a thermometer and reflux condenser. The polyurethane prepolymer vehicle made in this manner had a nonvolatile content of 60.9 percent, a free isocyanate percentage of 8.3 as NCO, a Gardner viscosity of X+⅛ and a Gardner color of one minus.

Forty grams of the pentaerythritol interesterified castor oil of Example XII having a hydroxyl value of about 280 were mixed with 101 grams of the polyurethane prepolymer. The nonvolatile content of the mixture was reduced to 50 percent with ethylene glycol ethyl ether acetate. A 3 mil wet film of this vehicle was cast on glass and dried at room temperature in approximately 24 hours and showed a Sward hardness of 73 after one week. When the film was exposed for 2 hours at a distance of 18 inches from a 400 watt mercury arc lamp giving ultraviolet light, no change in the excellent colorless appearance of the film occurred. A similar film made from a vehicle containing tolylene diisocyanate in the polymer structure showed some yellowing when exposed under conditions identical to those used with the vehicle made from 1-isocyanato-3-isocyanatomethyl-3,5,5-trimethyl cyclohexane.

EXAMPLE XV

Two hundred twenty one grams (2 equivalents) of 1-isocyanato-3-isocyanatomethyl - 3,5,5-trimethyl cyclohexane, 88.7 grams of ethlyene glycol ethyl ether acetate, 88.7 grams of xylene and 0.67 gram of dibutyl tin dilaurate were charged to a flask provided with a heating mantle, a mechanical stirrer, a thermometer, a reflux condenser and an inlet for gaseous nitrogen. Heating and stirring were started and when the temperature was 35° C., 45 grams (one equivalent) of trimethylol propane were added over about one hour. Heating with stirring was continued for four hours with the temperature kept at 65° to 68° C. After this the temperature was raised to 90° to 110° C. for 2½ hours and the batch cooled to room temperature under gaseous nitrogen. The Gardner viscosity of the vehicle was Z1+⅛ at 61.7 percent nonvolatile content, Gardner color one minus and percent NCO 8.80. The dry time of this prepolymer vehicle at 3 mils wet film thickness on a Morest Chart was 1½ hours.

Four hundred eighty grams of the prepolymer and 200 grams of the pentaerythritol interesterified castor oil of Example XII were mixed thoroughly and a 3 mil wet film was cast on a glass plate. This film dried in 3½ hours to a flexible film. When the dried film of this two component vehicle was exposed to ultraviolet light from a 400 watt mercury arc lamp at a distance of 18 inches from the sample for 2 hours, no change in color or appearance of the film occurred.

EXAMPLE XVI

Ten grams (.0204 equivalent) of the prepolymer whose preparation is described in Example XV with an equivalent weight of 491 and 10.55 grams (.0204 equivalent) of polypropylene glycol of equivalent weight 518 were mixed thoroughly along with 5 grams of xylene. After 16 hours standing the Gardner viscosity of this vehicle was A plus and its Gardner color was one minus. A 3 mil wet film of this vehicle cast on a Morest Chart was set to touch in 18 hours and dry in 24 hours. When this film was exposed for 2 hours to the ultraviolet light from a 400 watt mercury arc lamp at a distance of 18 inches from the film, only slight yellowing of the film occurred as shown by visual observation.

EXAMPLE XVII

One hundred grams (0.725 equivalent) of 1-isocyanato-3-isocyanatomethyl - 3,5,5 - trimethylcyclohexane, 38.5 grams of xylene and 38.5 grams ethyl glycol ethyl ether acetate were placed in a flask which has a mechanical stirrer, a reflux condenser, a thermometer, an inlet for gaseous nitrogen and a fiber glass heating mantle. With the temperature of the batch at 35° C., 16.4 grams (0.362 equivalent) of trimethylol propane was added during the course of two hours while stirring continually. The reaction temperature was then raised to 65° C. and kept at this level for 3¼ hours. A further heating period at 90° C. for 7¼ hours was used after which the nonvolatile content of the prepolymer vehicle was 53.3 percent by weight, the percent NCO 8.53, the Gardner viscosity U and the Gardner color one minus.

This prepolymer (100 grams) was reacted in 1:1 ratio of NCO/OH with 40.6 grams of a castor oil interesterified with pentaerythritol to a hydroxyl value of 280. A 3 mil wet film required over 24 hours for this two component vehicle to dry at room temperature. However, it dried hard in 15 minutes at 130° C. When the film on a Morest Chart was exposed to ultraviolet light from a 400 watt mercury arc lamp at a distance of 18 inches for 2 hours, no yellowing or other visible alteration of the film occurred.

EXAMPLE XVIII

To a suitable reaction flask 111 grams (1.0 equivalent) of 1-isocyanato - 3 - isocyanatomethyl - 3,5,5 - trimethyl cyclohexane, 3 grams (0.33 equivalent) of water, 40 grams of ethylene glycol ethyl ether acetate, 1 gram of triphenyl phosphate and 1 gram of dibutyl tin dilaurate were added. These reactants were stirred together under gaseous nitrogen at 27°–100° C. for 2½ hours after some heat of reaction was released. The resulting prepolymer vehicle had a percent NCO of 18.75, an American Public Health Association color of 30, a nonvolatile content of 61.9 percent by weight and a viscosity of 1.20 stokes.

Fifty grams of this prepolymer were mixed with 44.6 grams of castor oil interesterified to a hydroxyl value of 280 with pentaerythritol and 0.45 gram (.06 percent basis of solids) of dibutyl tin dilaurate. When a 3 mil wet film of this vehicle was cast on a Morest Chart it dried in 26½ hours. After one week the Sward hardness of the dried film was 57. This film yellowed slightly when exposed to the ultraviolet light produced by a 400 watt mercury arc lamp for 4 hours at a distance of 18 inches. A film cast in the same way from a similar vehicle made from an aromatic diisocyanate and exposed in the same manner to ultraviolet light yellowed to a greater degree than the one made from 1-isocyanato-3-isocyanatomethyl-3,5,5-trimethyl cyclohexane.

We claim:

1. A composition which comprises a liquid polyurethane prepolymer composition made from 1-isocyanato - 3 - isocyanatomethyl-3,5,5-trimethyl cyclohexane and aliphatic polyol, said polyurethane being made at an NCO/OH ratio of at least 1.2:1 and said aliphatic polyol having at least about 30 mole percent of the hydroxyl groups supplied by aliphatic polyol having at least three hydroxyl groups per molecule.

2. The composition of claim 1 in which the aliphatic polyol contains aliphatic polyol having two hydroxyl groups.

3. The composition of claim 2 which contains about 3 to 25 percent of free isocyanate groups based on the polyurethane content of the composition.

4. A composition which comprises a liquid polyurethane prepolymer composition made from 1-isocyanato-3-isocyanatomethyl-3,5,5-trimethyl cyclohexane and aliphatic polyol, the major portion by weight of said aliphatic polyol having a molecular weight of at least about 500, said polyurethane being made at an NCO/OH ratio of 1.2 to 2.5:1 and said aliphatic polyol having at least about 30 mole percent of the hydroxyl groups supplied by aliphatic polyol having at least three hydroxyl groups per molecule.

5. The composition of claim 4 which contains about 5 to 10 percent of free isocyanate groups based on the polyurethane content of the composition.

6. The composition of claim 4 in which the aliphatic polyol having a molecular weight of at least about 500 has the formula:

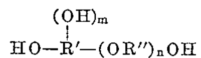

in which R′ is aliphatic hydrocarbon of 2 to 12 carbon atoms, R″ is alkylene of 2 to 4 carbon atoms, $n$ is a number sufficient to provide a polyol of at least about 500 molecular weight, and $m$ is 0 to 2.

7. The composition of claim 6 in which the aliphatic polyol contains a minor portion by weight of aliphatic polyol of up to about 200 molecular weight.

8. The composition of claim 7 in which the low molecular weight polyol is trimethylol propane.

9. A composition of claim 6 in which $m$ is 0.

10. The composition of claim 4 in which the at least three hydroxyl-containing aliphatic polyol has the formula:

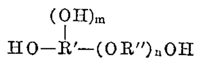

in which R′ is aliphatic hydrocarbon of 2 to 12 carbon atoms, R″ is alkylene of 2 to 4 carbon atoms, $n$ is a number sufficient to provide a polyol of at least about 500 molecular weight, and $m$ is 1 to 2.

11. A moisture-cured coating of the composition of claim 1.

12. A moisture-cured coating of the composition of claim 2.

13. A moisture-cured coating of the composition of claim 4.

14. A moisture-cured coating of the composition of claim 6.

15. A moisture-cured coating of the compostion of claim 9.

16. A moisture-cured coating of the composition of claim 10.

17. A composition which comprises a liquid polyurethane prepolymer composition made from 1-isocyanato-3-isocyanatomethyl-3,5,5-trimethyl cyclohexane and aliphatic polyol, the major portion by weight of said polyol being aliphatic polyol having a molecular weight of up to about 200, said polyurethane being made at an NCO to OH ratio of 1.4 to 3.5:1 and said aliphatic polyol having at least about 30 mole percent of the hydroxyl groups supplied by aliphatic polyol having three hydroxyl groups per molecule.

18. The composition of claim 17 which contains about 15 to 20 percent of free isocyanate groups biased on the polyurethane content of the composition.

19. The composition of claim 17 in which the aliphatic polyol has the formula:

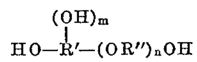

in which R′ is aliphatic hydrocarbon of 2 to 12 carbon atoms, R″ is alkylene of 2 to 4 carbon atoms, $n$ is a number which provides a polyol having a molecular weight of up to about 200, and $m$ is 1 to 2.

20 The composition of claim 17 in which the aliphatic polyol is trimethylol propane.

21. An aliphatic polyol-cured coating of the composition of claim 17.

22. An aliphatic polyol-cured coating of the composition of claim 19.

23. An aliphatic polyol-cured coating of the composition of claim 17 wherein the composition is cured by admixture with aliphatic polyol whose major portion by weight has a molecular weight of at least about 500.

24. An aliphatic polyol-cured coating of the composition of claim 17 wherein the composition is cured by admixture with aliphatic polyol whose major portion by weight has a molecular weight of at least about 500.

25. The composition of claim 10 in which the at least three hydroxyl-containing aliphatic polyol is trimethylolpropane and the aliphatic polyol having two hydroxyl groups is polypropylene glycol having a molecular weight of up to about 3000.

26. A moisture-cured coating of the composition of claim 25.

27. A composition which comprises a liquid prepolymer made from 1-isocyanato-3-isocyanatomethyl-3,5,5-trimethyl cyclohexane and water, said prepolymer being made at an NCO/OH ratio of at least 1.2:1.

28. An aliphatic polyol-cured coating of the composition of claim 27.

29. An aliphatic polyol-cured coating of the composition of claim 27 wherein the composition is cured by admixture with aliphatic polyol whose major portion by weight has a molecular weight of at least about 500.

30. The composition of claim 29 in which the curing aliphatic polyol is an ester of castor oil and pentaerythritol.

References Cited

UNITED STATES PATENTS

| | | | |
|---|---|---|---|
| 2,929,800 | 3/1960 | Hill | 260—77.5 |
| 3,352,830 | 11/1967 | Schmitt et al. | 260—77.5 |
| 3,351,573 | 11/1967 | Skreckoski | 260—18 |

OTHER REFERENCES

Saunders et al.: Polyurethanes, Part II, pp. 477–485 and 601–607 relied upon, 1964.

DONALD E. CZAJA, Primary Examiner

M. J. WELSH, Assistant Examiner

U.S. Cl. X.R.

117—127, 148, 161; 260—75, 77.5